United States Patent

[11] 3,607,034

[72] Inventors Joseph W. Henry
Johnstown;
Edward S. Loane, Reading, both of Pa.
[21] Appl. No. 628,705
[22] Filed Apr. 5, 1967
[45] Patented Sept. 21, 1971
[73] Assignee Pennsylvania Electric Company
Johnstown, Pa.

[54] REMOVAL OF SULFUR DIOXIDE FROM BOILER FLUE GASES
1 Claim, 7 Drawing Figs.

[52] U.S. Cl. ................................................ 23/168, 23/176
[51] Int. Cl. ........................................... C01b 17/74, C01b 17/60
[50] Field of Search ...................................... 23/176, 178, 226, 168

[56] References Cited
UNITED STATES PATENTS
| | | | |
|---|---|---|---|
| 1,789,460 | 1/1931 | Clark | 23/176 |
| 1,943,137 | 1/1934 | Mullen | 23/178 |
| 2,431,236 | 11/1947 | Fleming et al. | 23/226 |
| 2,161,056 | 6/1939 | Johnstone et al | 23/178 S |
| 3,142,536 | 7/1964 | Guth et al. | 23/168 |
| 3,172,725 | 3/1965 | Rugh | 23/168 |
| 3,386,798 | 6/1968 | Bevans et al. | 23/178 X |

OTHER REFERENCES
Bovier, " Sulfur-Smoke Removal System," pp 5– 7, fig 2, (paper presented at 26th Annual American Power Conference 4/16/64)
Perry, Chem Engr. Handbook, 4th ed (McGraw-Hill 1963) (sect 25, p41)

Primary Examiner—Oscar R. Vertiz
Assistant Examiner—Charles B. Rodman
Attorneys—Robert S. Dunham, R. J. Dearborn, P. E. Henninger, Lester W. Clark, John A. Harvey, Gerald W. Griffin, Thomas F. Moran and Howard J. Churchill ABSTRACT: A process for the removal of sulfur dioxide from boiler flue gases produced by the combustion of a sulfur-containing fuel, such as a sulfur-containing coal, wherein the sulfur-dioxide-containing boiler flue gases after cooling and removal of solid ash constituents are subjected to catalytic oxidation to convert the sulfur dioxide to sulfur trioxide. In carrying out the catalytic oxidation operation the relatively cool sulfur-dioxide-containing flue gases are brought up to an elevated temperature upwards of 750° F. at which the catalytic oxidation operation is carried out, by passing the sulfur-dioxide-containing flue gases in indirect countercurrent heat-exchange relationship with the sulfur trioxide-containing gases issuing from the catalytic oxidation operation. The sulfur-dioxide-containing flue gases are then further heated, such as by admixing therewith a high-temperature flue gas, just prior to subjecting the thus-heated sulfur-dioxide-containing flue gases to catalytic oxidation.

REMOVAL OF SULFUR DIOXIDE FROM BOILER FLUE GASES

BACKGROUND OF THE INVENTION

This invention relates to the removal of sulfur dioxide from combustion or boiler flue gases. More particularly, this invention is concerned with the removal of sulfur dioxide from boiler flue gases such as are generated at central power stations wherein a sulfur-containing fuel is burned with air.

FIELD OF THE INVENTION

In accordance with one embodiment this invention is directed to an improved method and apparatus for the removal of sulfur dioxide from boiler flue gas to alleviate and/or to avoid air pollution problems which might occur if the sulfur-dioxide-containing boiler flue gas were introduced into the atmosphere. In accordance with yet another embodiment this invention is directed to an improved technique for the handling of sulfur-dioxide-containing boiler flue gas to reduce the sulfur dioxide content before the boiler flue gas is discharged into the atmosphere. In accordance with yet another embodiment this invention is directed to an improved technique and apparatus for the conversion of the very minor amounts of sulfur dioxide present in said boiler flue gas to sulfur trioxide and the eventual recovery of the sulfur trioxide as sulfuric acid.

DESCRIPTION OF THE PRIOR ART

In copending, coassigned Pat. application Ser. No. 337,798 filed Jan. 15, 1964 in the name of Alexander J. Tigges and entitled "Recovery of Values from Sulfur Dioxide Containing Flue Gases" now abandoned, there is disclosed a technique and apparatus for the treatment and handling of sulfur-dioxide-containing flue gas to convert the sulfur dioxide content to sulfur trioxide, followed by conversion of the sulfur trioxide to sulfuric acid by reaction of the sulfur trioxide with water vapor present in the flue gas, and precipitation and recovery of the resulting produced sulfuric acid. The teachings and disclosures of the above-identified patent application are herein incorporated and made a part of this disclosure.

In the treatment of sulfur-dioxide-containing boiler flue gas in the process disclosed in the above-identified Tigges application the sulfur-dioxide-containing boiler flue gas is produced by the combustion with air of an ash-forming or particle-producing, sulfur-containing fuel, such as ash-forming, sulfur-containing coal or an ash-forming, sulfur-containing heavy fuel oil. It is necessary in the disclosed process that any solid particles present in the sulfur-dioxide-containing boiler flue gas be removed in a high temperature, about 800°–1000° F., solids-removal operation. It is desired that the solids-removal operation is carried out by means of a high-temperature electrical precipitator or other suitable solids removal device to effect substantially complete removal, above about 95 percent by weight, usually upwards of 99 and 99.5 percent by weight, of the solids content in the boiler flue gas as originally produced.

After the high-temperature solids-removal operation the resulting sulfur-dioxide-containing flue gas, now substantially solids-free, e.g. containing less than about 0.01 grain of solids per standard cubic foot of flue gas, but still at a relatively high temperature in the range 800°— F. and containing minor amounts of sulfur trioxide, oxygen and water vapor is directly, without the extraneous addition of heat or any substantial or significant cooling of the solids-free sulfur-dioxide-containing flue gas, subjected to a catalytic oxidation operation at a temperature in the range from about 750° F. to about 950° F. in the presence of a vanadium-pentoxide-containing catalyst to effect the conversion of the sulfur dioxide present in the flue gas to sulfur trioxide. The resulting sulfur-trioxide-enriched boiler flue gas is then cooled to effect reaction between the sulfur trioxide and the water vapor present in the flue gas to form sulfuric acid and to precipitate therefrom the sulfuric acid. The cooling operation is carried out to a temperature below the dew point of the sulfuric acid present in the thus-treated flue gas to effect precipitation of the sulfuric acid. Subsequently, the resulting precipitated sulfuric acid is recovered by means of suitable collection devices such as electric precipitators and/or mist collectors.

In the process described in the above-identified Tigges application it is an essential part of the operation that the solids-removal operation be carried out at a high temperature level in the range from about 800° to about 1000° F., more or less. Present day thermal power plants which burn solids-forming or ash-producing, sulfur-containing fuels, such as coal or oil, usually employ solids-removal equipment that operates only at low temperatures in the range 200°–450° F. Such plants must be considerably altered and must have the special high-temperature solids-removal equipment installed therein before the practices of the invention described in the above-identified application can be applied thereto.

SUMMARY OF THE INVENTION

There is a provided in accordance with this invention process and apparatus for the treatment of substantially solids-free, relatively low temperature, below about 500° F., such as below about 450° F., sulfur-dioxide-containing combustion or flue gas wherein the sulfur dioxide content of the combustion or flue gas is converted to sulfur trioxide. The resulting produced sulfur-trioxide-enriched combustion or flue gas is employed to heat the sulfur-dioxide-containing flue gas before subjecting it to catalytic oxidation. Then the sulfur-trioxide-enriched flue gas is subjected to a further reduction in temperature so as to convert the sulfur trioxide present in the flue gas to sulfuric acid by reaction with the water vapor present in the flue gas. The temperature to which the sulfur-trioxide-enriched flue gas is reduced is below the dew point temperatures of the sulfuric acid present therein with the result that sulfuric acid, usually in the form of a sulfuric acid mist, is precipitated. The resulting precipitated sulfuric acid is then recovered as a useful commercial product.

It is an object of this invention to provide a process and apparatus which can be "hooked-on" to present day thermal power plants which do not already contain or employ high-temperature solids-removal equipment but are equipped with high-efficiency low-temperature solids-removal apparatus capable of removing substantially all of the solids, e.g. to a solids content level below about 0.01 grain of solids per standard cubic foot of flue gas, from the boiler flue gases generated in such plants.

It is another object of this invention to provide an improved method and apparatus for the removal of sulfur dioxide from sulfur-dioxide-containing boiler flue gases and or the conversion of the sulfur dioxide content of said gases to sulfur trioxide.

Still another object of this invention is to provide an improved process and apparatus for the removal of sulfur dioxide from relatively cool boiler flue gases.

How these and other objects of this invention are achieved will become apparent in the light of the accompanying disclosure made with reference to the accompanying drawings wherein.

In at least one embodiment of the practices of this invention at least one of the foregoing objects will be achieved.

The sulfur dioxide present in the combustion gas undergoing treatment in accordance with this invention is usually present therein in a very minor amount, below about 2 percent by volume, such as below about 0.5 percent, usually below about 0.2 percent by volume. In addition to sulfur dioxide the combustion gas will contain relatively inert gases, such as nitrogen, carbon dioxide and carbon monoxide and water vapor, oxygen and sulfur trioxide.

The oxygen is usually present in the combustion gas due to the incomplete combustion of the ash-forming, sulfur-containing fuel and/or due to the fact that an excess of air or oxygen is employed in the combustion process. A very minor amount, usually below about 0.05 percent by volume sulfur trioxide, is usually present in the combustion gas. Water vapor is present in the combustion gas due to the fact that atmospheric air is employed in the combustion process and the fuel itself usually contains hydrogen in chemically combined form, such as in the from of a hydrocarbonaceous material, which upon combustion yields vapor.

The catalytic conversion operation for the conversion of sulfur dioxide present in the flue gas to sulfur trioxide is usually carried out at an elevated temperature in the rang 750°–1000° F., more frequently in the temperature range 825°–925° F. The catalyst employed in the catalytic conversion operation is preferably a vanadium-pentoxide-containing catalyst. A vanadium-pentoxide-containing catalyst exhibits satisfactory activity at the above-mentioned elevated temperatures for the satisfactory conversion of the sulfur dioxide to sulfur trioxide. Other catalysts effective at such elevated temperatures for the conversion of sulfur dioxide to sulfur trioxide are known and are also useful in the practices of this invention.

The temperature of the substantially solids-free, sulfur-dioxide-containing flue gas, such as a flue gas having a solids content below about 0.1, preferably below about 0.01, grain of solids per standard cubic foot, is usually below about 500°–450° F., e.g. 225–325° F., before it is subjected to treatment in accordance with this invention. It is desirable in accordance with this invention to complete the solids removal from the flue gas at a temperature in the range below about 500° F. since solids removal equipment, e.g. electrical precipitators, operative at such temperatures are readily available. If the solids-removal operation were to be completed at a significantly higher temperature, such as a temperature in the range 800°–1000° F. and higher, specialized solids-removal equipment would be required. It is a feature of this invention that the need for such specialized solids-removal equipment and its installation in a thermal power plant would not be required to carry out the practices of this invention.

Since the catalytic conversion operation wherein the sulfur dioxide is converted to sulfur trioxide is desirable carried out at a temperature in the range from about 750° to about 1000° F., e.g. in the range 825°–950° F., it is necessary in accordance with the practices of this invention to heat the substantially solids-free, relatively cool sulfur-dioxide-containing flue gas from a temperature below about 500° F., such as a temperature in the range 225°–325° F., e.g. 250° F., to a temperature in the range 750°–1000° F., such as a temperature in the range 825°–950° F., e.g. 850° F., before bringing the thus heated flue gas into contact with the catalyst.

In accordance with one embodiment of the practices of this invention the heating of this relatively cool sulfur-dioxide-containing flue gas from a temperature below about 500° F. to a temperature in the range 750°–1000° F. is effected at least in part by the extraneous addition of heat to the sulfur-dioxide-containing flue gas before it is brought into contact with the catalyst. Also, in accordance with another embodiment heat is supplied to e sulfur-dioxide-containing flue gas before it is brought into contact with the catalyst by passing the sulfur-dioxide-containing flue gas in indirect, countercurrent heat-exchange relationship with the hot, sulfur-trioxide-enriched flue gas as it leaves the catalytic converter. By passing the sulfur-dioxide-containing flue gas in indirect, countercurrent heat-exchange relationship with respect to the sulfur-trioxide-enriched flue gas as it leaves the catalytic converter a substantial heat economy is effected. Not only is heat economy effected but advantageously the sulfur-trioxide-enriched gases leaving the catalytic converter are reduced in temperature. The reduced temperature of the sulfur-trioxide-enriched flue gas is desirable and necessary in the practices of this invention since temperature reduction of the sulfur-trioxide-enriched flue gas below the dew point temperature of the sulfuric acid which is formed in situ therein is necessary to effect the removal and recovery of the sulfuric acid.

Figure 1:
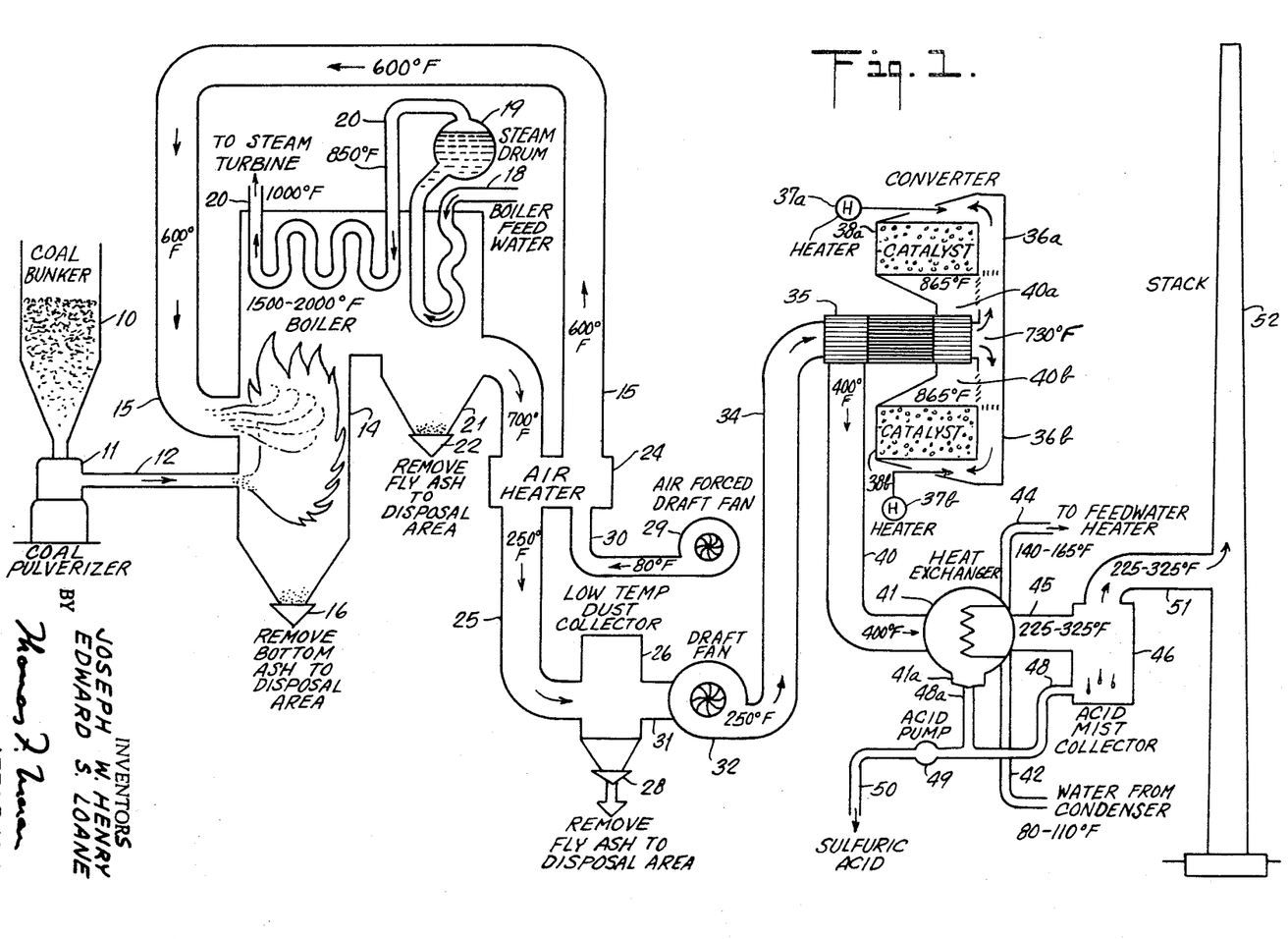
FIG. 1 schematically illustrates one embodiment of the practice of this invention for the removal of sulfur dioxide from thermal power plants which burn a particle-forming or ash-producing, sulfur-containing fuel, such as an ash-forming, sulfur-containing coal.

Referring now to FIG. 1 of the drawings, there is illustrated therein an embodiment of the practices of this invention as applied to a thermal steam-generating plant wherein pulverized sulfur-containing coal is burned with air and the resulting hot combustion gases employed to generate steam and then treated in accordance with the practices of this invention to effect removal of sulfur oxide gases, sulfur dioxide and sulfur trioxide therefrom. As illustrated in FIG. 1 sulfur-containing, ash-forming coal is supplied, from coal bunker 10 to coal pulverizer 11 from which it is supplied, such as by air from a fan, via gas duct 12 to boiler 14 where it is burned with preheated air, e.g. at a temperature of about 600° F. supplied via duct 15 to boiler 14.

In the combustion process within boiler 14 the larger size ash particles tend to accumulate at the bottom of the front section of boiler 14 and are removed therefrom from time to time via ash-removal device 16.

The hot combustion gases at a temperature in the range 1500°–2000° F. and higher, comprising carbon monoxide carbon dioxide, nitrogen, unconsumed and/or excess oxygen and the sulfur oxide gases including sulfur dioxide and sulfur trioxide formed during the combustion process by the burning of the sulfur constituent of the coal and also water vapor supplied to and/or created in the combustion process, are employed to generate steam.

As schematically illustrated preheated boiler feed water is supplied via line 18 and is heated in the upper section of boiler 14. The resulting heated feed water flows into steam drum 19. Steam at a temperature of about 850° F., more or less, flows from steam drum 19 via line 20 into the superheater section of boiler 14 and is discharged therefrom via line 20 at varying pressures, either subcritical or supercritical, and at a temperature in the range 800°–1050° F. and higher, to the steam turbine, not illustrated, for electrical power generation or process use.

The hot combustion gases after passing through the upper portion of the boiler are reduced in temperature to about 700° F., more or less. At the same time the larger fly-ash particles entrained in the hot combustion gases tend to drop out in the back section and are recovered from ash pit 21 associated with boiler 14 and are removed therefrom from time to time by means of ash removal device 22.

The hot combustion gases at a temperature of about 700° F. but still containing entrained therein a significant amount of finely divided fly-ash particles pass through one side of air heater 24, such as a regenerative or recuperative type air heater. After leaving air heater 24 the combustion gases at a temperature in the range from about 350° F. to about 225° F., more or less, e.g. 250° F., and flowing at a velocity of about 30 feet per second, more or less, pass via duct 25 to low temperature dust collector 26 wherein substantially all of the entrained fly-ash particles and ash constituents are collected and removed via ash-removal device 28.

As illustrated forced draft fan 29 supplies atmospheric air at ambient temperature, e.g. about 80° F. via duct 30 to the other side of air heater 24 wherein it picks up the heat from the combustion gases flowing through said one side of air heater 24. The resulting preheated air leaves air heater 24 via duct 15 at a suitable elevated temperature, such as a temperature in the range 500°–700° F., more or less, e.g. 600° F., and supplied to the burners of boiler 14 to effect combustion of the coal.

In the operation of air heater 24 it is not especially desirable that the hot combustion gases flowing therethrough be reduced to a temperature substantially lower than about 225° F. since it must be realized that after the removal of the entrained solids therein the combustion gases containing the sulfur oxide gases must be reheated to an elevated temperature in the range 750°–1000° F. before being treated to effect the catalytic conversion of the sulfur dioxide therein to sulfur trioxide. It is desirable that the combustion gases after leaving air heater 24 are at a temperature at which the entrained solids can be separated therefrom at about maximum or optimum efficiency within dust collector 26.

The sulfur-dioxide-containing combustion gases are drawn from low-temperature dust collector 26 via duct 31 and moved by means of draft fan 32 and duct 34 to one end of heat exchanger 35. The relatively low temperature sulfur-dioxide-containing combustion gases supplied to one end of heat exchanger 35 at a temperature of about 250° F. leave the other end of heat exchanger 35 at a temperature in the range of about 650°–750° F., e.g. 730° F., are heated additionally to a temperature in the range 825°–950° F., e.g. 850° F. and are introduced via flow paths 36a and 36b into catalytic converters 38a and 38b, respectively. The sulfur-dioxide-containing combustion gases move through catalytic converters 38a and 38b in contact with the vanadium-pentoxide-containing catalyst therein. As the combustion gases flow through catalytic converters 38a and 38b the sulfur dioxide present therein is converted by catalytic oxidation with the oxygen present in the combustion gases to sulfur trioxide. The resulting sulfur-trioxide-enriched stream of combustion gases leave catalytic converters 38a and 38b at a temperature in the range of about 840°–965° F., e.g. 865° F., and enter the other end of heat exchanger 35 and flow therethrough in indirect, countercurrent heat-exchange relationship with respect to the relatively cool stream of sulfur-dioxide-containing combustion gases supplied to said one end of heat exchanger 35 via line 34.

Upon passing through heat exchanger 35 the sulfur-trioxide-enriched flue gas is reduced in temperature, such as a temperature in the range 350°–450° F., e.g. 400° F., and leave heat exchanger 35 via conduit 40.

As illustrated in FIG. 1 heaters or suitable source of heat 37a and 37b which must be employed, if necessary and/or desired, to supply additional heat to the sulfur-dioxide-containing combustion gases just before these gases enter catalytic converters 38a and 38b, respectively, so as to maintain the catalytic converters and the catalytic oxidation of the sulfur dioxide to sulfur trioxide at the desired and optimum temperature.

The relatively cool sulfur-trioxide-enriched combustion gases flow via duct 40 through heat exchanger 41 wherein the gases flow in indirect heat-exchange relationship with relatively cool water, at a temperature in the range about 80°–110° F., supplied to heat exchanger 41 via pipe 42. The resulting heated water leaves heat exchanger 41 via pipe 44 at an increased temperature, such as a temperature in the range 140°–165° F., e.g. 140° F., and is eventually supplied to the upper section of boiler 14 via line 18 for conversion to steam. The resulting cooled combustion gases leave heat exchanger 41 via duct 45 at a temperature in the range 225°–325° F., e.g. 300° F. The sulfur-trioxide-enriched combustion gases upon passing through heat exchanger 41 are reduced in temperature with the result that the sulfur trioxide content thereof reacts with the water vapor present in the combustion gas to form sulfuric acid. Further, the temperature of the combustion gases leaving heat exchanger 41 is below the dew point of the sulfuric acid present in the combustion gas with the result that sulfuric acid in the form of an acid mist is condensed or precipitated. The resulting precipitated sulfuric acid mist is recovered by means of mist collector 46 and the resulting collected acid flows therefrom via line 48 and acid pump 49 through line 50 to suitable sulfuric acid storage facilities. Sulfuric acid tends to be precipitated and to collect within heat exchanger 41. This sulfuric acid is collected in sump 41a provided in the bottom section of heat exchanger 41 and is removed therefrom via line 48a for eventual collection via line 50.

The resulting combustion gases now substantially free of sulfuric acid and having a very substantially reduced sulfur dioxide/ and/or sulfur trioxide content e.g. below about 0.04 percent by volume sulfur dioxide and below about 0.0005 percent by volume sulfur trioxide, are supplied from mist collector 46 via line 51 at a temperature in the range 225°–325° F., more or less, to stack 52 for eventual discharge into the atmosphere. As illustrated in FIG. 1 the sulfur-oxide-lean combustion gases enter stack 52 at a velocity of about 40–60 feet per second, more or less, and are discharged into the atmosphere at a substantially increased velocity, such as about 100–150, e.g. 120 feet per second, more or less.

Figures 2, 3:
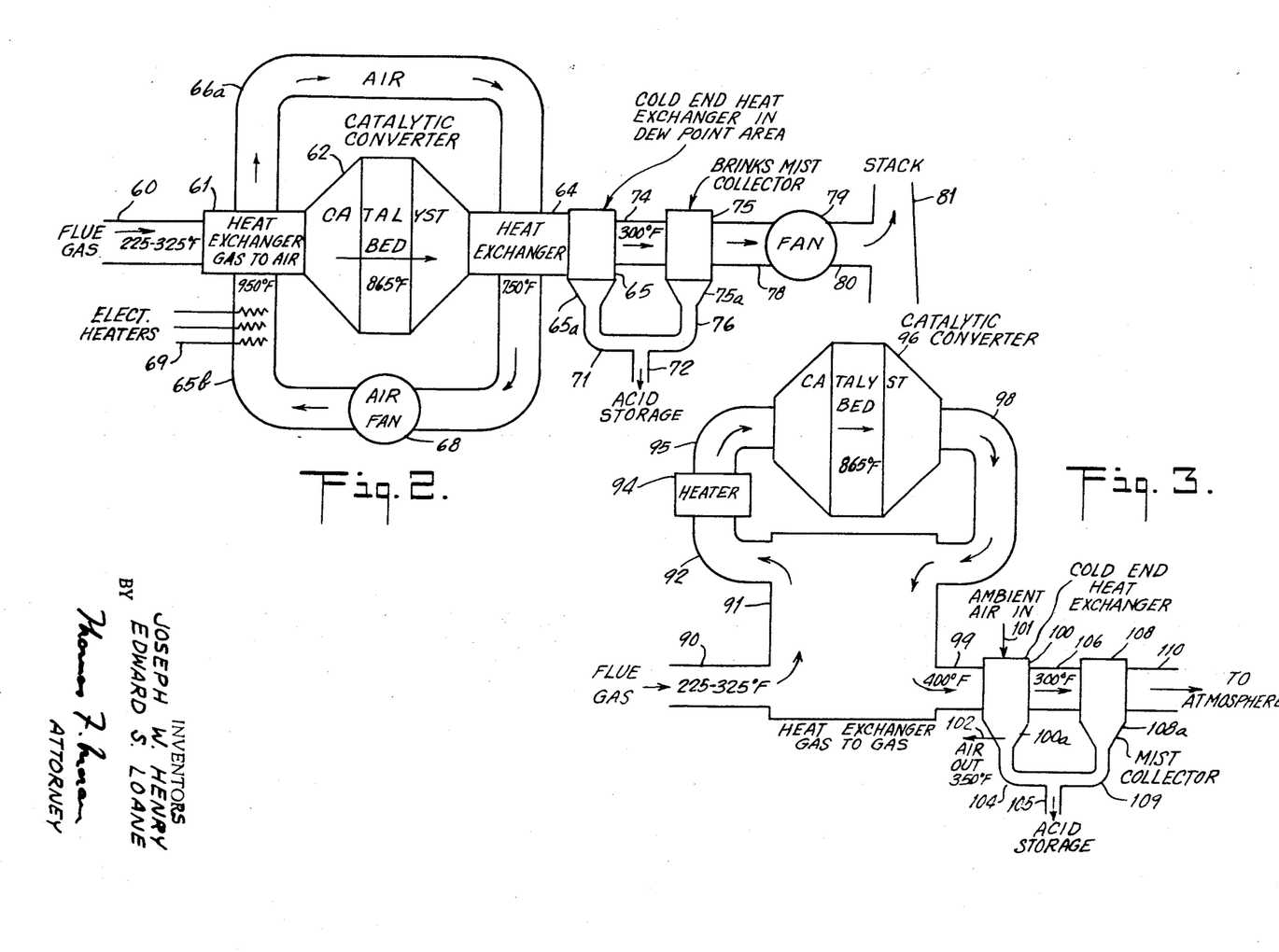
FIGS. 2 and 3 schematically illustrate separate embodiments of the practice of this invention involving the treatment of a substantially solids-free, sulfur-dioxide-containing flue gas for the conversion of the sulfur dioxide content therein to sulfur trioxide.

Referring now to FIG. 2 of the drawings which schematically illustrates another embodiment of the practices of this invention, there is illustrated the use of a heat-exchange fluid employed to pick up heat from the sulfur-trioxide-enriched flue gas leaving the converter and to transfer this heat to the sulfur-dioxide-containing flue gas being supplied to the catalytic converter. As illustrated in FIG. 2 sulfur-dioxide-containing flue gas at a temperature in the range about 325°–225° F. flows through duct 60 and through heat exchanger 61 into catalytic converter 62. The sulfur-dioxide-containing flue gas upon leaving heat exchanger 61 is at a temperature of about 840°–965° F., e.g. 850° F., a temperature sufficiently high to assure the maintenance of the vanadium-pentoxide-containing catalyst bed and the catalytic oxidation reaction at a temperature of about 850°–865° F. within catalytic converter 62. The resulting trioxide-enriched flue gas leaves catalytic converter 62 at a temperature of about 865° F. and passes through heat exchanger 64 into cold end heat exchanger 65.

Upon passing through heat exchanger 64 the sulfur-trioxide-enriched flue gas is reduced in temperature from about 865° F. to about 600°–400° F., more or less. Associated with heat exchangers 61 and 64 is a heat-exchange fluid circulating loop 66a and 66b. The heat exchange fluid indicated circulating within heat-exchange loop 66a and 66b is air. Other gaseous heat-exchange fluids may also be employed, such as carbon dioxide, nitrogen or flue gas itself. Heat-exchange fluid circulating means or air fan 68 is employed to circulate the air within loop 66a and 66b.

On the downstream side of air fan 68, preferably just before the air passes through heat exchanger 61, the air is heated by suitable means, such as by means of electrical resistance heater 69, to an elevated temperature, e.g. about in the range 925°–1000° F., e.g. 950° F. The thus-heated air flows in indirect heat-exchange relationship therein with respect to the sulfur-dioxide-containing flue gas supplied to heat exchanger 61 via line 60. After passing through heat exchanger 61 the air is substantially reduced in temperature, to a temperature below about 500° F., e.g. about 300° F. The heat of the air passing through heat exchanger 61 is supplied to the sulfur-dioxide-containing flue gas just before the sulfur-dioxide-containing flue gas enters catalytic converter 62.

After leaving heat exchanger 61 the relatively cool air moves along circulating loop portion 66a and passes through heat exchanger 64 wherein it flows in indirect heat-exchange relationship with repeat to the sulfur-trioxide-enriched flue gas issuing from a catalytic converter 62 and flowing through heat exchanger 64. As a result of the air flowing through loop portion 66a and through heat exchanger 64 the air is increased in temperature substantially above about 500° F., such as a temperature in the range 600°–800° F., e.g.750° F. At the same time the sulfur-trioxide-enriched flue gases from catalytic converter 62 and flowing through heat exchanger 64 are substantially reduced in temperature, e.g. a temperature below about 500° F. The resulting heated air leaving heat exchanger 64 then flows along loop portion 66b towards air fan 68 which serves to maintain the air in circulation throughout loop 66a and 66b.

After leaving heat exchanger 64 the relatively cool sulfur-trioxide-enriched flue gas passes through cold end heat exchanger 65 wherein its temperature is further reduced to below about 350° F., such as a temperature in the range 325°–225° F., e.g. 300° F. As the sulfur-trioxide-enriched flue gas is cooled within cold end heat exchanger 65 some sulfuric acid is formed and precipitated therein. This precipitated sulfuric acid is collected from sump 65a of cold end heat exchanger 65 via pipes 71 and 72 for storage. The cool flue gas issuing from cold end heat exchanger 65 passes via duct 74 into acid mist collector 75, such as Brink's mist collector, wherein the sulfuric acid mist contained in the flue gas is recovered and collected in sump 75a of mist collector 75 and passes via pipes 76 and 72 to storage. The resulting flue gas substantially depleted of sulfuric acid flows from mist collector 75 via duct 78 to fan 79 from which it is discharged via conduit 80 to stack 81 for discharge into the atmosphere.

Referring now to FIG. 3 of the drawings which illustrates another embodiment in accordance with the practices of this invention for the handling and treatment of relatively cool sulfur-dioxide-containing flue gas, as illustrated in FIG. 3 cool, substantially solids-free, sulfur-dioxide-containing glue gas at a temperature of about 225°–325° F. is supplied via duct 90 to one end of heat exchanger 91. The sulfur-dioxide-containing flue gas flows through heat exchanger 91 and issues therefrom at the other end via duct 92 from which it flows through heater 94 and duct 95 into catalytic converter 96.

The sulfur-dioxide-containing flue gas upon flowing from one end to heat exchange 91 to the other end and upon flowing through heater 94 is increased to an elevated temperature above about 825° F., such as a temperature in the range 825°–950° F., at which temperature it is supplied to catalytic converter 96 so as to maintain the catalytic oxidation reaction of the sulfur dioxide to sulfur trioxide at a temperature level in the range 840°–975° F., e.g. about 865° F. Desirably, catalytic converter 96 is provided with a gas-permeable bed or plurality of beds of vanadium-pentoxide-containing catalyst. Upon issuing from catalytic converter 96 via conduit 98 the resulting sulfur-trioxide-enriched flue gas flows into said other end of heat exchanger 91 and emerges therefrom via conduit 99.

As illustrated in FIG. 3 heat exchange 91 serves to effect indirect, countercurrent heat exchange between the relatively cool sulfur-dioxide-containing flue gas being supplied to catalytic converter 96 and the relatively hot sulfur-trioxide-enriched flue gas issuing from catalytic converter 96. Heater 94 is provided to impart necessary supplemental heating to the sulfur-dioxide-containing flue gas being supplied directly to the catalytic converter. Heater 94 may comprise electrical resistance heaters or may comprise in combination an oil burner and a gas-mixing zone wherein hot combustion gases are admixed with the sulfur-dioxide-containing flue gas to increase the temperature of the sulfur-dioxide-containing flue gas. Also, heater 94 may comprise means for diverting hot combustion gases from a boiler furnace directly for admixture with the relatively cool, substantially solids-free, sulfur-dioxide-containing flue gas which is supplied to heat exchanger 91 via duct 90.

The sulfur-trioxide-enriched flue gas at a temperature in the range 350°–450° F., e.g. about 400° F., upon issuing from heat exchanger 91 via duct 99 passes through cold end heat exchanger 100 wherein its temperature is reduced to a temperature in the range 225°–325° F., e.g. about 300° F. As illustrated in FIG. 3 ambient air supplied via duct 101 serves as the coolant fluid for cold end heat exchanger 100. The air, now heated to a temperature above about 275° F., e.g. about 350° F., issues via line 102 from cold end heat exchanger 100. The resulting heated air is usefully employed in accordance with the practices of this invention to supply air to air heater 24, see FIG. 1, and to supply preheated air for the combustion of the fuel within boiler 14, see FIG. 1, wherein the hot, ash-containing, sulfur-containing flue gases are initially generated.

Within cold end heat exchanger 100 some sulfuric acid condensation takes place. The resulting condensed sulfuric acid is collected in sump 100a of cold end heat exchanger 100 and flows therefrom via pipes 104 and 105 to acid storage.

The resulting cooled, sulfuric-acid-mist-containing flue gas flows from cold end heat exchanger 100 via duct 106 to mist collector 108 wherein substantially all of the sulfuric acid mist is collected and recovered via sump 108a of mist collector 108 and conduits 109 and 105. The substantially acid-free residual flue gas issues from mist collector 108 via duct 110 at a substantially reduced temperature for eventual discharge into the atmosphere.

Figure 4:
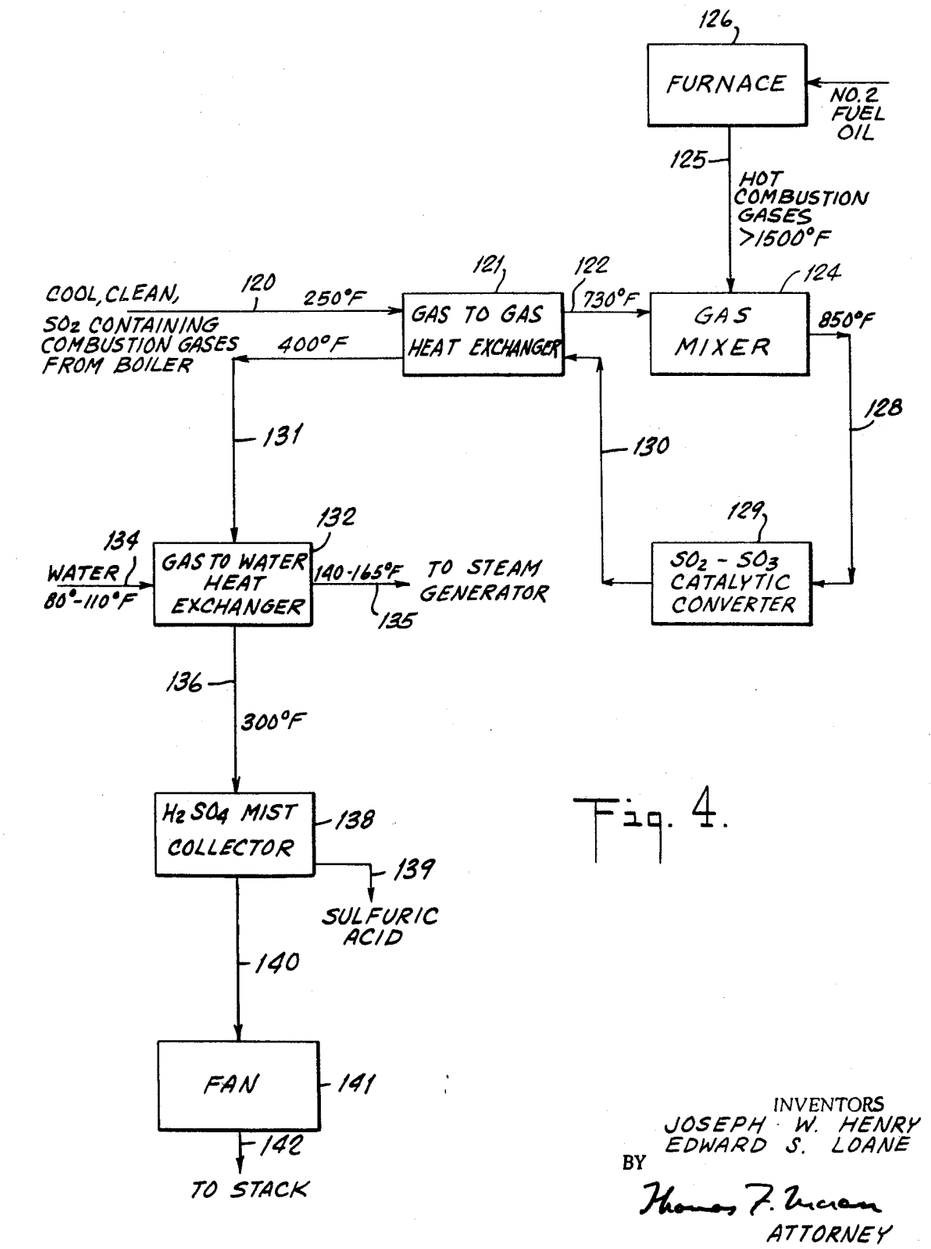
FIGS. 4–6 schematically illustrate in block diagrammatic form various embodiments for the handling of a relatively cool, solids-free, sulfur-dioxide-containing flue gas under conditions of improved heat economy for the conversion of the sulfur dioxide content to sulfur trioxide and the conversion of the sulfur trioxide to sulfuric acid and the recovery of the resulting produced sulfuric acid; and wherein FIG. 7 schematically illustrates in block diagrammatic form further cooling of the produced $SO_3$-enriched flue gases to control the temperature of the gases emitted from the stack.

Referring now to FIG. 4 of the drawings, there is illustrated therein another embodiment in accordance with the practices of this invention. In the embodiment illustrated in FIG. 4 hot gases generated by the combustion of a low-ash-content fuel oil, such as No. 2 fuel oil, are admixed with the sulfur-dioxide-containing flue gas before the sulfur-dioxide-containing flue gas is sent to the catalytic converter to effect the catalytic oxidation of the sulfur dioxide therein to sulfur trioxide. The hot combustion gases are employed to bring the sulfur-dioxide-containing flue gas up to the desired temperature level for the catalytic oxidation of sulfur dioxide to sulfur trioxide.

As illustrated in FIG. 4, clean, substantially solids-free sulfur-dioxide-containing flue gas, originally supplied by the combustion of an ash-forming, sulfur-containing fuel, at a temperature in the range 225°–325° F., e.g. about 250° F., is supplied via line 120 to heat exchanger 121. The sulfur-dioxide-containing flue gas flows from heat exchanger 121 at a temperature in the range 650°–750° F., e.g. about 730° F., via line 122 to gas mixer or gas-mixing device 124 wherein it is admixed with relatively hot, at a temperature above 1500° F., solids-free combustion gases supplied via line 125. The hot combustion gases in line 125 are supplied by the combustion substantially ash-free fuel oil, such as No. 2 fuel oil, in furnace 126. The resulting hot sulfur-dioxide-containing gases at a temperature in the range 825°–950° F., e.g. about 850° F., issue from gas mixer 124 via line 128 and are supplied to catalytic converter 129 wherein catalytic oxidation of the sulfur dioxide therein to sulfur trioxide is effected.

The hot sulfur-trioxide-enriched flue gases issue from catalytic converter 129 at a temperature in the range 840°–975° F., e.g. about 865° F., via line 130 and are supplied to heat exchanger 121 for countercurrent, indirect heat-exchange relationship with respect to the sulfur-dioxide-containing flue gas supplied via line 120 to heat exchanger 121.

The sulfur-trioxide-enriched gases after flowing in indirect, countercurrent heat exchange relationship within heat exchanger 121 with respect to the sulfur-dioxide-containing flue gas supplied thereto via heat exchanger 121 issue from heat exchanger 121 via line 131 at a temperature in the range 350°–450° F., e.g. about 400° F. The resulting relatively cool sulfur-trioxide-enriched gases are then supplied to water-cooled, indirect heat exchanger 132 wherein the sulfur-trioxide-enriched gases are cooled to about 225°—325° F., e.g. about 300° F. Water at a temperature of about 80°–110° F. is supplied to heat exchanger 132 via line 134 and issues therefrom via line 135 at a temperature of about 140°–165° F. Water issuing from heat exchanger 132 via line 135 is advantageously employed as part of the boiler feed water to the steam-generation unit from which the sulfur-dioxide-containing flue gases are originally produced.

After the sulfur-trioxide-enriched flue gases are cooled within heat exchanger 132 sulfuric acid is condensed therefrom and drained through a trap seal (not illustrated) to line 139. Sulfuric acid remaining as mist issues from heat exchanger 132 via line 136 and is supplied to sulfuric acid mist collector 138 wherein the acid is collected and recovered via line 139. The residual gases now substantially free of sulfuric acid are supplied from mist collector 138 via line 140 to fan 141 from which the gases are forced via line 142 into a stack, not shown, for eventual discharge into the atmosphere.

Figure 5:
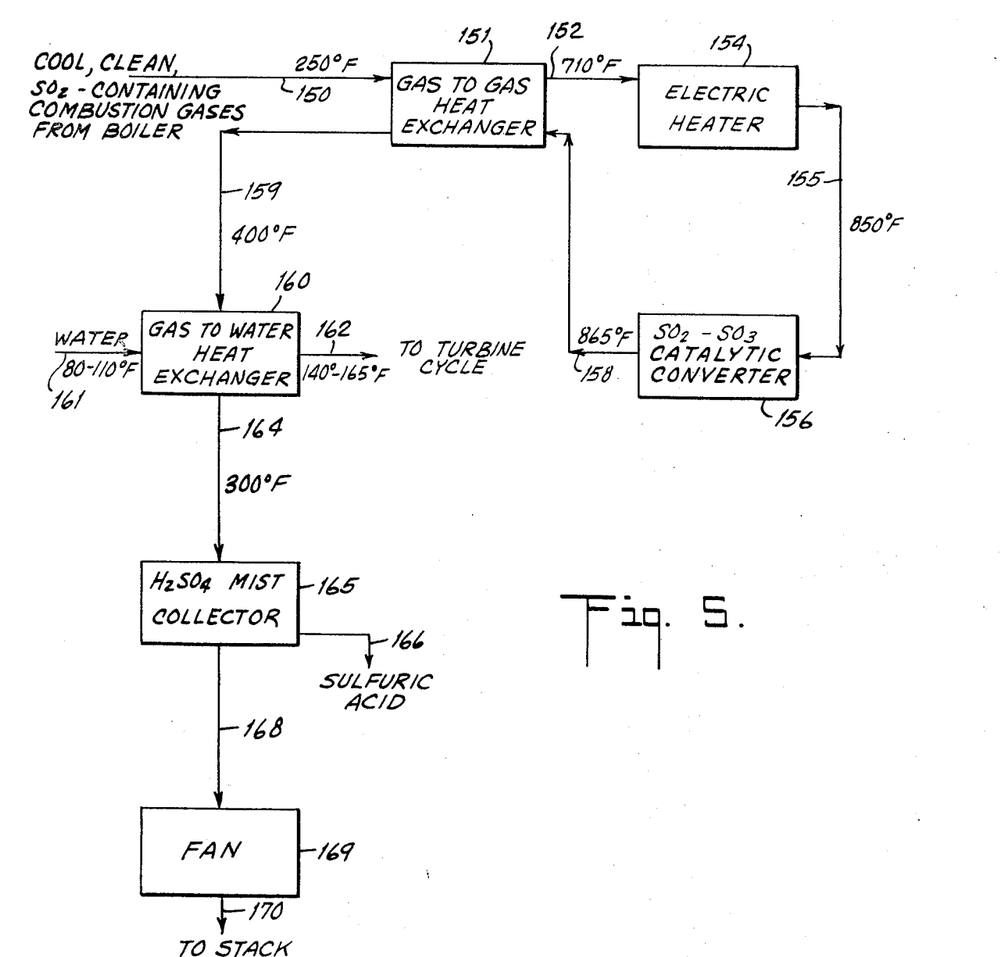

Referring now to FIG. 5 of the drawings, there is schematically illustrated therein an embodiment of the invention wherein electrical heating is employed to supply extraneous heat to the $SO_2$-containing flue gases before these gases are supplied to the catalytic converter for catalytic oxidation of the $SO_2$ to $SO_3$. As illustrated in FIG. 5 substantially solids-free $SO_2$-containing flue gas at a temperature in the range of about 225° F. to about 325° F., e.g. 250° F., is supplied via duct 150 to one end of gas-to-gas heat exchanger 151 wherein the $SO_2$-containing flue gas flows in indirect countercurrent heat exchange relationship with relatively hot $SO_3$-containing flue gas.

Upon issuing from heat exchanger 151 via duct 152 the $SO_2$-containing flue gas at a temperature in the range from about 650°F. to about 750°F., e.g. 710°F. is brought into contact with electric heater 154 wherein the $SO_2$-containing flue gas is heated to a temperature in the range from about 825°F. to about 950°F., e.g. 850°F. The resulting electrically heated gas issues from electric heater 154 via duct 155 and is supplied to catalytic converter 156 wherein the sulfur dioxide in the heated flue gas is catalytically converted to sulfur trioxide.

The resulting $SO_3$-containing flue gas issues from catalytic converter 156 via duct 158 at a temperature in the range from about 840° F. to about 975° F., e.g. about 865° F., and is then supplied to the other end of heat exchanger 151 wherein, as previously indicated, the $SO_3$-containing flue gas flows in indirect heat exchange relationship with the $SO_2$-containing flue gases supplied to said one end of heat exchanger 151 via duct 150. Upon passage through heat exchanger 151 the $SO_3$-containing flue gas heats the $SO_2$ containing flue gas. The resulting cooled $SO_3$ containing flue gas with resulting reduction in temperature of the $SO_3$-containing flue gas. The resulting cooled $SO_3$-containing flue gas leaves heat exchanger 151 via duct 159 at a temperature in the range from about 350°F. to about 450°F., e.g. 400°F.

The cooled $SO_3$-containing flue gas is supplied via duct 159 to water to gas heat exchanger 160. Heat exchanger 160 is supplied via pipe 161 with relatively cool water at a temperature in the range from about 80° F. to about 110° F., e.g. about 72° F. On flowing through heat exchanger 160 the relatively cool water flows in indirect heat-exchange relationship with respect to the $SO_3$-containing flue gas also flowing through heat exchanger 160. The water upon flowing through and issuing from heat exchanger 160 via pipe 162 is increased in temperature to a temperature in the range from about 140° F. To about 165° F., e.g. about 148° F. This water may, if desired, be supplied to the boiler feed water heater and/or otherwise introduced to the turbine cycle for steam generation.

Upon issuing from heater 160 via pipe 164 the $SO_3$-containing flue gas at a temperature in the range from about 225° F. to about 325° F., e.g. about 300° F., is supplied via line 164 to acid-mist collector 165. The resulting collected acid at a concentration in the range about 90–93 percent by weight $H_2SO_4$, more or less, is recovered from collector 165 via pipe 166.

After having passed through acid-mist collector 165 the resulting gas now substantially free of sulfur trioxide and/or sulfuric acid is supplied via duct 168 to induced-draft fan 169 from which it is moved via duct 170 to a stack, not shown, for discharge into the atmosphere.

Figure 6:
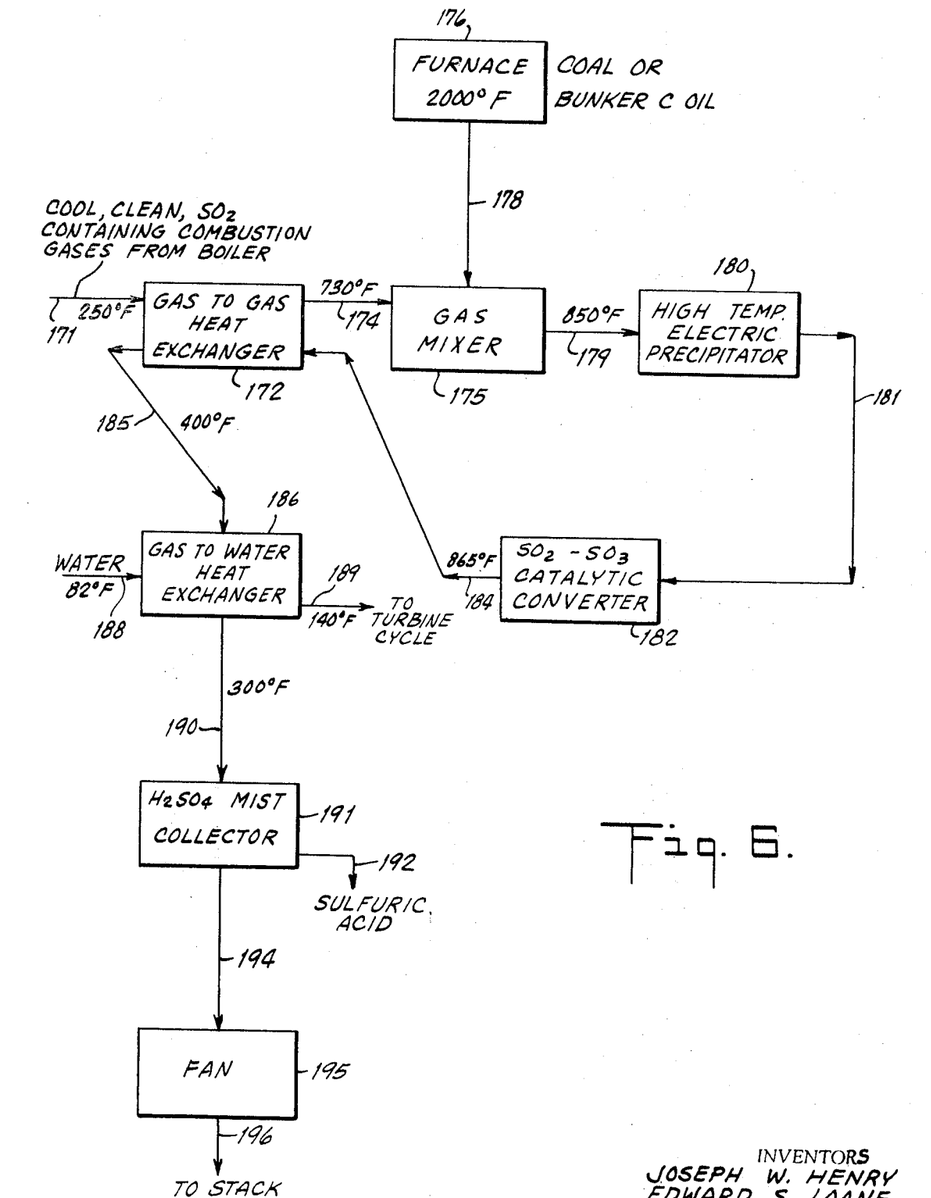

Referring now to FIG. 6 of the drawings, there is schematically illustrated therein another embodiment of the practice of this invention wherein instead of electric heating, as illustrated in FIG. 5 of the drawings, the combustion of coal or a heavy oil, such as Bunker C oil, is employed to supply extraneous heat to the preheated sulfur-dioxide-containing flue gases before these gases are subjected to catalytic oxidation for the conversion of sulfur dioxide to sulfur trioxide.

Cool, clean $SO_2$-containing flue gases are supplied via duct 171 at a temperature in the range from about 225° F. to about 325° F., e.g. 250° F., to one end of gas heat exchanger 172 wherein they are passed in indirect heat-exchange relationship with hot $SO_3$-enriched gases. The resulting heated $SO_2$-containing gases issue from heater 172 via duct 174 at a temperature in the range from about 650° F. to about 750° F., e.g. 730° F., and are supplied to gas mixer 175. Within gas mixer 175 the $SO_2$-containing flue gases are admixed with high-temperature combustion gases at a temperature of about 2700°–3000° F. supplied by the combustion of coal and/or heavy oil, such as Bunker C oil, within furnace 176 and introduced into gas mixer 175 via duct 178.

The resulting admixed gases containing sulfur dioxide and ash or other solid constituents derived from the combustion of the coal and/or Bunker C oil at an elevated temperature in the range from about 825° F. to about 950° F., e.g. about 850° F., are supplied via duct 179 to high-temperature electric precipitator 180. Within electric precipitator 180 the solids or ash constituents of the gases are removed and there issues from electric precipitator 180 via duct 181 a substantially clean, substantially solids-free $SO_2$-containing gas stream which is then supplied directly to catalytic converter 182 wherein the $SO_2$ component of the admixed gases is converted to $SO_3$.

The resulting $SO_3$-enriched gases at a temperature in the range from about 840° F. to about 975° F., e.g. 865° F., issue from catalytic converter 182 via duct 184 and are passed directly to the other end of heat exchanger 172 wherein the relatively hot $SO_3$-enriched gases pass in indirect heat-exchange relationship with the relatively cool $SO_2$-containing flue gases supplied via duct 171 to said one end of heat exchanger 172.

Cooled $SO_3$-enriched gases at a temperature in the range from about 350° F. to about 450° F., e.g. about 400° F., issue from heat exchanger 172 via duct 185 and are passed directly to gas-to-water heat exchanger 186. Gas-to-water heat exchanger 186 is supplied with relatively cool water at a temperature in the range from about 80° F. to about 110° F., e.g. about 82° F., via pipe 188. Within heat exchanger 186 the relatively cool water passes in indirect heat exchange relationship with the relatively hot $SO_3$-enriched gases supplied to heat exchanger 186 via duct 185. Heated water at a temperature in the range from about 140° to about 165° F., e.g. about 140° F., issues from heat exchanger 186 via pipe 189 for use as boiler feed water for subsequent introduction into the turbine cycle for steam generation.

The resulting cooled $SO_3$-enriched flue gases at a temperature in the range from about 225° F. to about 325° F., e.g. about 300° F., issue from heat exchanger 186 via duct 190 and pass directly into $H_2SO_4$ mist collector 191 wherein the resulting formed $H_2SO_4$ mist is collected and recovered via pipe 192.

After passing through mist collector 191 the resulting treated flue gases now substantially free of $SO_3$ and/or $H_2SO_4$ mist are supplied via duct 194 to induced-draft fan 195 from which the gases are forced via duct 196 to a stack, not shown, for discharge into the atmosphere.

Figure 7:
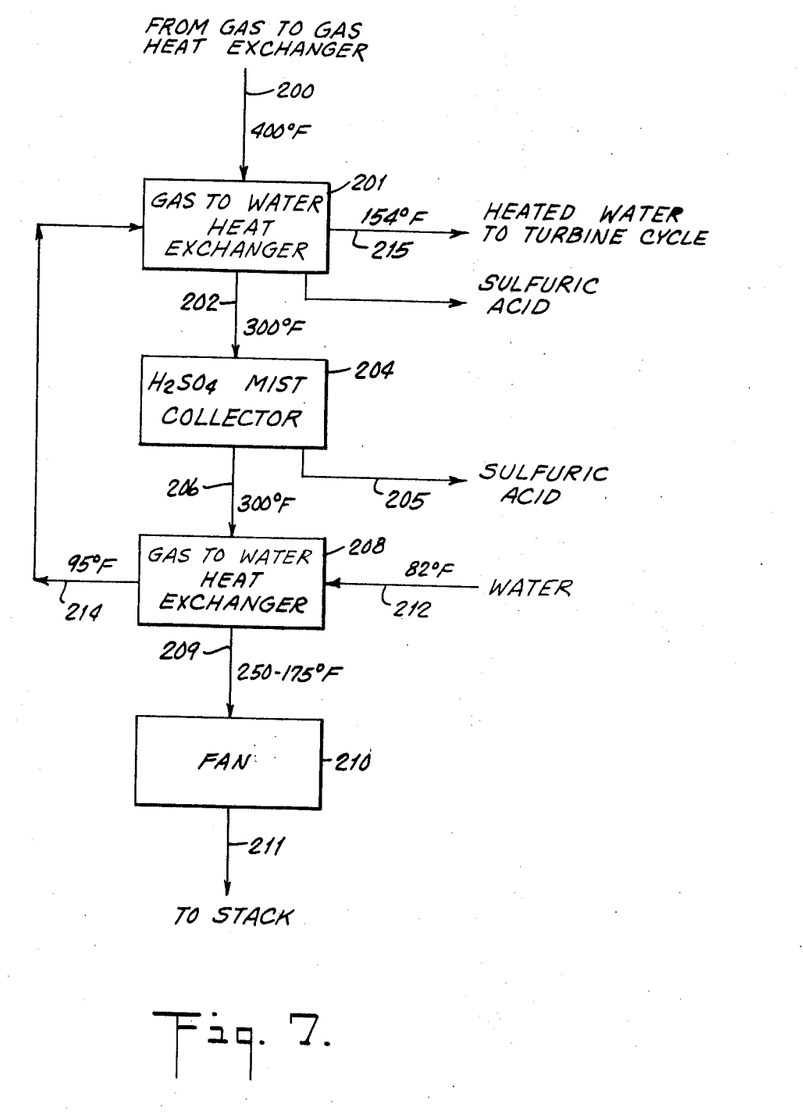

Referring now to FIG. 7 of the drawings, there is schematically illustrated therein a modification of the practice of this invention involving the adjustment or the reduction of the temperature of the substantially sulfur-trioxide-free and/or sulfuric-acid-free flue gases after these gases have passed through a mist collector. More particularly, in accordance with this embodiment or modification of the practice of the invention the $SO_3$-enriched flue gases after having passed through a gas-to-gas heat exchanger, such as, by way of example, heat exchanger 172 illustrated in FIG. 6 or heat exchanger 121 illustrated in FIG. 4, are supplied at a temperature of about 400° F. via duct 200 to gas-to-water heat exchanger 201. After having passed through heat exchanger 201 the resulting cooled gases now containing sulfuric acid mist at a temperature of about 300° F. are supplied via conduit 202 to $H_2SO_4$ mist collector 204. Sulfuric acid is recovered from mist collector 204 via pipe 205.

The substantially SO₃-free and/or H₂SO₄-free gases issuing from mist collector 204 are then directed via duct 206 to gas-to-water heat exchanger 208 wherein the substantially SO₃-free and/or H₂SO₄-free gases are further reduced in temperature. The resulting cooled, substantially SO₃-free and/or H₂SO₄-free gases are then supplied from heat exchanger 208 via duct 209 to fan 210 from which they are discharged via conduit 211 via a stack, not shown, into the atmosphere.

Relatively cool water at a temperature of about 82° F. is supplied via pipe 212 to heat exchanger 208 to cool the substantially SO₃-free and/or H₂SO₄-free gases flowing therethrough. Upon passing through heat exchanger 208 the water is heated to a temperature of about 95° F. and is supplied via pipe 214 to heat exchanger 201 where, like the water supplied to heat exchanger 201 via line 212 it passes in indirect heat-exchange relationship with relatively hot gases. Upon flowing through heat exchanger 201 the water supplied thereto via pipe 214 is heated to a temperature of about 154° F. and is then passed via pipe 215 to a boiler feed water heater, if desired, and eventually to the turbine cycle for steam generation.

The embodiment of the practice of this invention illustrated in FIG. 7 is particularly useful when it is desired to control the temperature of the gases discharged into the atmosphere. The substantially SO₃-free and/or H₂SO₄-free gases in accordance with this embodiment of the invention can be discharged into the atmosphere at substantially any operable, desired temperature, such as a temperature of about 200° F. or higher, e.g. a temperature in the range 250–300° F.

The distinctive and invention-characterizing feature of the embodiments of the invention illustrated in and described herein with respect to FIGS. 1–6 resides in the utilization of the heat in the sulfur-trioxide-enriched gases issuing from the catalytic converter to heat the sulfur-dioxide-containing flue gases being delivered to the catalytic converter for the catalytic oxidation of the sulfur dioxide to sulfur trioxide. The sulfur-dioxide-containing flue gas being thus treated and heated in accordance with this invention is usually produced by the combustion of an ash-forming, sulfur-containing fuel, such as coal, heavy fuel oil, lignite or other fuels or mixtures thereof. Before the sulfur-dioxide-containing flue gas is treated in accordance with this invention the solids content, such as entrained solid particles, e.g. fly ash, is substantially completely removed therefrom to a level below about 0.1, preferably below about 0.01 grain per standard cubic foot. Additionally, in accordance with a special feature and embodiment of this invention, the solids-containing, sulfur-dioxide-containing flue gas is cooled to a temperature below about 500° F., such as a temperature in the range 400°–300° F., more or less, before the solids-removal operation at a relatively low temperature, below about 500° F., standard conventional solids-removal equipment for the most part already in place can be utilized and no new high-performance, i.e. solids-removal equipment capable of operating at a high temperature above about 800° F., need be employed. This means that the various embodiments of the invention described and illustrated therein may be attached or "hooked-on" to existing steam-generating thermal power plant installations more readily than if high-temperature solids-removal equipment were required.

As will be apparent to those skilled in the art in the light of the foregoing disclosure, many modifications, alterations and substitutions are possible in the practice of this invention without departing from the spirit or scope thereof.

We claim:

1. In a process for recovery of sulfur values in the form of sulfuric acid from combustion gases wherein an ash-producing, sulfur-containing coal is burned with air to yield hot combustion gases containing particle-form material, oxygen, water vapor and less than 2 percent by volume sulfur dioxide and wherein said hot combustion gases are cooled to a relatively low temperature below about 450° F. but not lower than 250° F. and wherein substantially all of said particle-form material is removed from the resulting cooled combustion gases to yield a relatively cool stream of said combustion gases substantially free of solids, below about 0.1 grain of solids per standard cubic foot, and sulfur values are recovered from said gas in the form of sulfuric acid the improvement which comprises heating said cool stream of combustion gases to an elevated temperature in the range from about 750° F. to about 1000° F. by passing said cool stream of combustion gases in countercurrent indirect heat-exchange relationship with a relatively hot stream of combustion gas having an increased concentration of sulfur trioxide and admixing therewith hot combustion gas produced by the combustion of fuel oil, subjecting the resulting heated stream of combustion gases to contact with a vanadium-pentoxide-containing catalyst effective to catalytically oxidize the sulfur dioxide present therein to sulfur trioxide to produce said stream of combustion gas having an increased concentration of sulfur trioxide, the temperature of said stream of combustion gas having an increased concentration of sulfur trioxide being reduced to a temperature in the range from about 450° F. to about 300° F. after having passed in countercurrent indirect heat-exchange relationship with said cool stream of combustion gas, subjecting the resulting cooled stream of combustion gas having an increased concentration of sulfur trioxide to additional cooling to a temperature in the range from about 200° F. to about 250° F. to precipitate the sulfuric acid present therein due to the reaction between sulfur trioxide and water vapor and recovering the resulting precipitated sulfuric acid.

UNITED STATES PATENT OFFICE
CERTIFICATE OF CORRECTION

Patent No. 3,607,034           Dated September 21, 1971

Inventor(s) Joseph W. Henry and Edward S. Loane

It is certified that error appears in the above-identified patent and that said Letters Patent are hereby corrected as shown below:

Column 4, line 60, after "larger" the words -- ash-constituents and larger -- should be inserted Column 11, last line, after "operation" the words -- is completed. By completing the solids removal operation -- should be inserted Column 2, line 51, "or" should read -- for --
Column 3, line 28, after "yields" the word -- water -- should be inserted
Column 4, line 3, "e" should read -- the --
Column 6, line 70, "repeat" should read -- respect --
Column 9, line 45, "72°F." should read -- 82°F. --

Signed and sealed this 5th day of September 1972.

(SEAL)
Attest:

EDWARD M. FLETCHER, JR.           ROBERT GOTTSCHALK
Attesting Officer           Commissioner of Patents